United States Patent
Oztaskent et al.

(10) Patent No.: US 10,992,993 B2
(45) Date of Patent: *Apr. 27, 2021

(54) METHODS, SYSTEMS, AND MEDIA FOR PRESENTING SUPPLEMENTAL INFORMATION CORRESPONDING TO ON-DEMAND MEDIA CONTENT

(71) Applicant: Google LLC, Mountain View, CA (US)

(72) Inventors: Ant Oztaskent, Sutton (GB); Yaroslav Volovich, Cambridge (GB); Ingrid McAulay Trollope, Richmond (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,916

(22) Filed: Oct. 14, 2019

(65) Prior Publication Data

US 2020/0120391 A1    Apr. 16, 2020

Related U.S. Application Data

(63) Continuation of application No. 16/005,048, filed on Jun. 11, 2018, now Pat. No. 10,448,110, which is a
(Continued)

(51) Int. Cl.
*H04N 21/4722* (2011.01)
*H04N 21/2665* (2011.01)
(Continued)

(52) U.S. Cl.
CPC ....... *H04N 21/4722* (2013.01); *G06F 16/903* (2019.01); *G06F 16/951* (2019.01);
(Continued)

(58) Field of Classification Search
CPC .......... H04N 21/4722; H04N 21/2225; H04N 21/2665; H04N 21/4307; H04N 21/8586;
(Continued)

(56) References Cited

U.S. PATENT DOCUMENTS 6,240,555 B1 *  5/2001  Shoff ................. H04N 5/44543
                                                348/E5.104
6,901,366 B1     5/2005  Kuhn et al.
(Continued)

FOREIGN PATENT DOCUMENTS

CN     1471672      1/2004
CN     1518710      8/2004
(Continued)

OTHER PUBLICATIONS

Decision to Refuse a European Patent Application dated Jan. 14, 2019 in EP Patent Application No. 14830459.5.
(Continued)

*Primary Examiner* — Chenea Davis
(74) *Attorney, Agent, or Firm* — Byrne Poh LLP

(57) ABSTRACT

Methods, systems, and media for presenting supplemental information corresponding to on-demand media content are provided. In some implementations, the method comprises: receiving an indication from a web browser extension executing within a web browsing application that a media content item is being presented on a content provider website; identifying the media content item being presented on the content provider website; determining whether supplemental content associated with the broadcasted media content item is available; in response to determining that the supplemental content is available, causing the web browser extension to present an indicator that the supplemental content is available; obtaining the supplemental content corresponding to the broadcasted media content item, wherein each piece of the supplemental content is associated with timing information of the broadcasted media content item; and causing a portion of the obtained supplemental content to be presented concurrently with the media content
(Continued)

item in response to detecting that the indicator has been selected.

19 Claims, 5 Drawing Sheets

Related U.S. Application Data continuation of application No. 15/649,370, filed on Jul. 13, 2017, now Pat. No. 9,998,795, which is a continuation of application No. 15/272,027, filed on Sep. 21, 2016, now Pat. No. 9,712,878, which is a continuation of application No. 14/191,059, filed on Feb. 26, 2014, now Pat. No. 9,456,237.

(60) Provisional application No. 61/922,236, filed on Dec. 31, 2013.

(51) Int. Cl.
*H04N 21/2225* (2011.01)
*H04N 21/858* (2011.01)
*G06F 16/903* (2019.01)
*G06F 16/951* (2019.01)
*H04N 21/43* (2011.01)
*H04N 21/8405* (2011.01)
*H04N 21/8547* (2011.01)

(52) U.S. Cl.
CPC ..... *H04N 21/2225* (2013.01); *H04N 21/2665* (2013.01); *H04N 21/4307* (2013.01); *H04N 21/8586* (2013.01); *H04N 21/8405* (2013.01); *H04N 21/8547* (2013.01)

(58) Field of Classification Search
CPC .......... H04N 21/8405; H04N 21/8547; H04N 21/4126; H04N 21/25891; H04N 21/47202; H04N 21/812; H04N 21/8133; H04N 21/25883; H04N 21/2668; H04N 21/42203; H04N 21/4223; H04N 21/44008; H04N 21/44218; H04N 21/4758; H04N 21/47815; H04N 21/4884; H04N 21/6582; H04N 21/8126; H04N 21/8173; H04N 21/8456; H04N 5/23206; H04N 21/2353; H04N 21/2408; H04N 21/2542; H04N 21/266; H04N 21/2743; H04N 21/42646; H04N 21/4302; H04N 21/435; H04N 21/4355; H04N 21/442222; H04N 21/4622; H04N 21/4756; H04N 21/4828; H04N 21/485; H04N 21/6377; H04N 21/658; H04N 21/8113; H04N 21/84; H04N 21/8549; H04N 21/858; H04N 5/235; H04N 5/445; H04N 5/76; H04N 5/783; H04N 5/85; H04N 5/91; H04N 7/17318; H04N 7/17336; H04N 9/8042; H04N 9/8205; G06F 17/30864; G06F 17/30964
See application file for complete search history.

(56) References Cited

U.S. PATENT DOCUMENTS

| | | | |
|---|---|---|---|
| 7,421,376 B1* | 9/2008 | Caruso | G06F 16/634 702/190 |
| 7,840,980 B2 | 11/2010 | Gutta | |
| 8,185,543 B1 | 5/2012 | Choudhry et al. | |
| 8,205,223 B2 | 6/2012 | Pack et al. | |
| 8,392,951 B2 | 3/2013 | Park et al. | |
| 8,484,017 B1 | 7/2013 | Sharifi et al. | |
| 8,929,657 B2 | 1/2015 | Jung | |
| 2002/0147984 A1 | 10/2002 | Tomsen et al. | |
| 2007/0124756 A1 | 5/2007 | Covell et al. | |
| 2007/0150462 A1 | 6/2007 | Nonaka et al. | |
| 2008/0098432 A1 | 4/2008 | Hardacker et al. | |
| 2008/0226119 A1 | 9/2008 | Candelore et al. | |
| 2008/0229363 A1 | 9/2008 | Lanfermann et al. | |
| 2009/0276805 A1 | 11/2009 | Andrews et al. | |
| 2010/0036828 A1 | 2/2010 | Carmel et al. | |
| 2010/0082585 A1 | 4/2010 | Barsook et al. | |
| 2010/0131847 A1* | 5/2010 | Sievert | G06Q 30/0254 715/719 |
| 2010/0332967 A1 | 12/2010 | Kraft et al. | |
| 2011/0022633 A1 | 1/2011 | Bernosky et al. | |
| 2011/0093492 A1* | 4/2011 | Sull | G11B 27/034 707/769 |
| 2011/0103763 A1 | 5/2011 | Tse et al. | |
| 2011/0125735 A1 | 5/2011 | Petrou | |
| 2011/0184814 A1* | 7/2011 | Konkol | G06Q 30/0273 705/14.69 |
| 2011/0246495 A1 | 10/2011 | Mallinson | |
| 2011/0247042 A1 | 10/2011 | Mallinson | |
| 2011/0264700 A1 | 10/2011 | Mei et al. | |
| 2011/0282906 A1 | 11/2011 | Wong | |
| 2011/0289098 A1 | 11/2011 | Oztaskent et al. | |
| 2012/0019352 A1 | 1/2012 | Menard et al. | |
| 2012/0047156 A1 | 2/2012 | Jarvinen et al. | |
| 2012/0078889 A1 | 3/2012 | Chu-Carroll et al. | |
| 2012/0096499 A1 | 4/2012 | Dasher et al. | |
| 2012/0117057 A1 | 5/2012 | Adimatyam et al. | |
| 2012/0167144 A1 | 6/2012 | Avison-Fell | |
| 2012/0227074 A1 | 9/2012 | Hill et al. | |
| 2012/0240144 A1 | 9/2012 | Rose | |
| 2012/0240177 A1 | 9/2012 | Rose | |
| 2012/0291072 A1 | 11/2012 | Maddison et al. | |
| 2012/0291073 A1 | 11/2012 | Friedman | |
| 2012/0311623 A1 | 12/2012 | Davis et al. | |
| 2012/0311641 A1 | 12/2012 | Allard | |
| 2013/0036442 A1 | 2/2013 | Wingert | |
| 2013/0047178 A1 | 2/2013 | Moon et al. | |
| 2013/0086105 A1 | 4/2013 | Hammontree et al. | |
| 2013/0104172 A1 | 4/2013 | Lee et al. | |
| 2013/0104179 A1 | 4/2013 | Shah | |
| 2013/0111514 A1 | 5/2013 | Slavin et al. | |
| 2013/0139209 A1 | 5/2013 | Urrabazo et al. | |
| 2013/0160038 A1 | 6/2013 | Slaney et al. | |
| 2013/0179436 A1 | 7/2013 | Yun et al. | |
| 2013/0227622 A1 | 8/2013 | Landow et al. | |
| 2013/0272676 A1 | 10/2013 | Mo et al. | |
| 2014/0089423 A1 | 3/2014 | Jackels | |
| 2014/0250116 A1 | 9/2014 | Hsu et al. | |
| 2014/0253472 A1 | 9/2014 | Ayoub et al. | |
| 2014/0255003 A1 | 9/2014 | Abramson | |
| 2014/0298211 A1* | 10/2014 | Mehta | G06Q 30/02 715/760 |
| 2014/0344670 A1 | 11/2014 | Simeon et al. | |
| 2015/0193433 A1 | 7/2015 | Dykeman et al. | |

FOREIGN PATENT DOCUMENTS

| | | |
|---|---|---|
| CN | 1735162 | 2/2006 |
| CN | 1804829 | 7/2006 |
| CN | 101566990 | 10/2009 |
| CN | 101883230 | 11/2010 |
| CN | 101981574 | 2/2011 |
| CN | 102833617 | 12/2012 |
| CN | 102868934 | 1/2013 |
| CN | 101557464 | 6/2013 |
| EP | 2388721 | 11/2011 |
| EP | 2501144 | 9/2012 |
| JP | 2001169269 | 6/2001 |
| JP | 2005092295 | 4/2005 |
| JP | 2006270869 | 10/2006 |
| JP | 2010154415 | 7/2010 |
| JP | 2011035628 | 2/2011 |
| JP | 2011243204 | 12/2011 |
| JP | 2012118918 | 6/2012 |
| JP | 2013016030 | 1/2013 |

(56) References Cited

FOREIGN PATENT DOCUMENTS

| | | |
|---|---|---|
| JP | 2013529325 | 7/2013 |
| KR | 20060077988 | 7/2006 |
| KR | 20110125917 | 11/2011 |
| WO | WO 2002077864 | 10/2002 |
| WO | WO 2009036435 | 3/2009 |
| WO | WO 2011123718 | 10/2011 |
| WO | WO 2012014130 | 2/2012 |
| WO | WO 2012139240 | 10/2012 |
| WO | WO 2013040533 | 3/2013 |

OTHER PUBLICATIONS

Decision to Refuse a European Patent Application dated Oct. 9, 2019 in EP Patent Application No. 14830460.3.
Decision to Refuse a European Patent Application dated Nov. 15, 2018 in EP Patent Application No. 14725797.6.
Examination Report dated Jan. 19, 2018 in EP Patent Application No. 14830459.5.
Examination Report dated Feb. 6, 2018 in EP Patent Application No. 14830460.3.
Examination Report dated Apr. 13, 2017 in EP Patent Application No. 14725797.6.
International Search Report and Written Opinion of the International Search Authority dated Mar. 17, 2015 in International Patent Application No. PCT/US2014/072261.
International Search Report and Written Opinion of the International Search Authority dated Apr. 17, 2015 in International Patent Application No. PCT/US2014/072258.
International Search Report and Written Opinion of the International Search Authority dated Jul. 28, 2014 in International Patent Application No. PCT/US2014/024255.
Notice of Allowance dated Jan. 22, 2018 in U.S. Appl. No. 15/649,370.
Notice of Allowance dated Jan. 24, 2018 in U.S. Appl. No. 14/191,034.
Notice of Allowance dated Mar. 16, 2017 in U.S. Appl. No. 15/272,027.
Notice of Allowance dated Apr. 17, 2015 in U.S. Appl. No. 13/827,413.
Notice of Allowance dated May 24, 2016 in U.S. Appl. No. 14/191,059.
Notice of Allowance dated May 30, 2019 in U.S. Appl. No. 16/005,048.
Notice of Allowance dated Jun. 5, 2015 in U.S. Appl. No. 13/826,910.
Notice of Allowance dated Nov. 9, 2016 in U.S. Appl. No. 15/005,470.
Office Action dated Jan. 5, 2016 in U.S. Appl. No. 14/191,034.
Office Action dated Jan. 14, 2020 in U.S. Appl. No. 16/011,053.
Office Action dated Jan. 16, 2015 in U.S. Appl. No. 14/191,059.
Office Action dated Jan. 20, 2016 in U.S. Appl. No. 14/191,059.
Office Action dated Jan. 23, 2018 in U.S. Appl. No. 15/431,431.
Office Action dated Jan. 23, 2019 in CN Patent Application No. 201480071926.8.
Office Action dated Jan. 30, 2015 in U.S. Appl. No. 13/826,910.
Office Action dated Feb. 2, 2019 in CN Patent Application No. 201480071614.7.
Office Action dated Feb. 26, 2019 in U.S. Appl. No. 16/005,048.
Office Action dated Mar. 13, 2018 in JP Patent Application No. 2016-501451.
Office Action dated Mar. 25, 2015 in U.S. Appl. No. 13/834,394.
Office Action dated Apr. 17, 2018 in CN Patent Application No. 201480021167.4.
Office Action dated Apr. 23, 2015 in U.S. Appl. No. 14/191,059.
Office Action dated May 15, 2019 in AU Patent Application No. 2014374036.
Office Action dated Jun. 2, 2017 in U.S. Appl. No. 14/191,034.
Office Action dated Jun. 4, 2019 in JP Patent Application No. 2016-543706.
Office Action dated Jun. 29, 2017 in U.S. Appl. No. 15/431,431.
Office Action dated Jul. 5, 2018 in U.S. Appl. No. 15/431,431.
Office Action dated Jul. 14, 2016 in U.S. Appl. No. 14/191,034.
Office Action dated Jul. 22, 2019 in CN Patent Application No. 201480071614.7.
Office Action dated Jul. 22, 2019 in CN Patent Application No. 201480071926.8.
Office Action dated Jul. 25, 2019 in CN Patent Application No. 201480021167.4.
Office Action dated Jul. 27, 2016 in U.S. Appl. No. 15/005,470.
Office Action dated Jul. 29, 2014 in U.S. Appl. No. 13/826,910.
Office Action dated Sep. 5, 2018 in JP Patent Application No. 2016-543706.
Office Action dated Sep. 6, 2017 in U.S. Appl. No. 14/191,034.
Office Action dated Sep. 20, 2018 in U.S. Appl. No. 16/005,048.
Office Action dated Sep. 20, 2019 in U.S. Appl. No. 16/011,053.
Office Action dated Sep. 27, 2017 in U.S. Appl. No. 15/431,431.
Office Action dated Oct. 20, 2016 in U.S. Appl. No. 14/191,034.
Office Action dated Nov. 17, 2017 in U.S. Appl. No. 15/649,370.
Office Action dated Dec. 1, 2016 in U.S. Appl. No. 15/272,027.
Office Action dated Dec. 9, 2014 in U.S. Appl. No. 13/827,413.
Office Action dated Dec. 16, 2019 in CA Patent Application No. 2,908,549.
Office Action dated Dec. 21, 2018 in CA Patent Application No. 2,908,549.
Summons to Attend Oral Proceedings dated Feb. 2, 2018 in EP Patent Application No. 14725797.6.
Summons to Attend Oral Proceedings dated Feb. 18, 2019 in EP Patent Application No. 14830460.3.
Summons to Attend Oral Proceedings dated Jul. 12, 2018 in EP Patent Application No. 14830459.5.
YouTube, "Pharos Demonstration—Audiovisual Tunable Search—Part C", last updated Jan. 16, 2010, pp. 1, available at: https://www.youtube.com/watch?v=ZpxyNi6Ht50.
Examination Report dated Mar. 16, 2020 in in Patent Application No. 3412/KOLNP/2015.
Notice of Allowance dated Mar. 25, 2020 in KR Patent Application No. 10-2015-7028591.
Notice of Allowance dated Apr. 8, 2020 in U.S. Appl. No. 16/011,053.
Office Action dated Apr. 23, 2020 in CN Patent Application No. 201480021167.4.
Office Action dated Jul. 24, 2020 in U.S. Appl. No. 16/011,053.
Notice of Allowance dated Jan. 1, 2021 in U.S. Appl. No. 16/011,053.
Office Action dated Jan. 19, 2021 in CA Patent Application No. 2,935,568.
Office Action dated Dec. 28, 2020 in KR Patent Application No. 10-2016-7018931.
Office Action dated Dec. 28, 2020 in KR Patent Application No. 10-2016-7020499.

* cited by examiner

METHODS, SYSTEMS, AND MEDIA FOR PRESENTING SUPPLEMENTAL INFORMATION CORRESPONDING TO ON-DEMAND MEDIA CONTENT

CROSS-REFERENCE TO RELATED APPLICATIONS

This application is a continuation of U.S. patent application Ser. No. 16/005,048, filed Jun. 11, 2018, which is a continuation of U.S. patent application Ser. No. 15/649,370 filed Jul. 13, 2017, which is a continuation of U.S. patent application Ser. No. 15/272,027, filed Sep. 21, 2016, which is a continuation of U.S. patent application Ser. No. 14/191,059, filed Feb. 26, 2014, which claims the benefit of U.S. Provisional Patent Application No. 61/922,236, filed Dec. 31, 2013, each of which is hereby incorporated by reference herein in its entirety.

TECHNICAL FIELD

The disclosed subject matter relates to methods, systems, and media for presenting supplemental information corresponding to on-demand media content.

BACKGROUND

While watching a program, a viewer is often interested in information relating to the program. For example, the viewer may want to search for additional information about a topic that is discussed in the program.

Search engines allow the viewer to search on the Internet for resources, which include webpages, images, video content, and audio content. A typical search engine provides a web page for entering search terms, where the search terms are inputted by the viewer. Search results conducted for particular search terms are provided to the viewer. Moreover, with the advent of mobile devices, the use of mobile search engines has increased. For example, using a mobile device, the viewer may perform a search and browse through Internet content while watching the program.

Text-based search engines, however, may be somewhat limited for this user. In an example where the user wants to find an article similar to that which is being discussed during a program, the user may attempt to obtain this information by entering one or more keywords into a search engine. The user then scans through search results to find a webpage containing information relating to the topic of the discussion. This can be a time consuming procedure for the user. Moreover, this can cause the user to miss a substantial portion of the program or cause the user to pause the program to obtain such information via this procedure.

Accordingly, mechanisms for presenting supplemental information corresponding to on-demand media content are provided.

SUMMARY

Methods, systems, and media for presenting supplemental information corresponding to on-demand media content are provided.

In accordance with some implementations of the disclosed subject matter, a method for providing information relating to media content is provided, the method comprising: receiving, using a hardware processor, an indication from a web browser extension executing within a web browsing application that a media content item is being presented on a content provider website; identifying the media content item being presented on the content provider website by determining whether the media content item presented by the content provider website has also been previously broadcasted by a television provider and associating the media content item with a broadcasted media content item provided by the television provider; determining whether supplemental content associated with the broadcasted media content item is available; in response to determining that the supplemental content is available, causing the web browser extension to present an indicator that the supplemental content is available; obtaining the supplemental content corresponding to the broadcasted media content item, wherein each piece of the supplemental content is associated with timing information of the broadcasted media content item; and causing a portion of the obtained supplemental content to be presented concurrently with the media content item in response to detecting that the indicator has been selected, wherein the portion of the obtain supplemental content is selected based on current timing information of the media content item currently being provided by the content provider.

In accordance with some implementations of the disclosed subject matter, a system for providing information relating to media content is provided, the system comprising a hardware processor that is configured to: receive, from a web browser extension executing within a web browsing application, an indication that a media content item is being presented on a content provider website; identify the media content item being presented on the content provider website by determining whether the media content item presented by the content provider website has also been previously broadcasted by a television provider and associating the media content item with a broadcasted media content item provided by the television provider; determine whether supplemental content associated with the broadcasted media content item is available; in response to determining that the supplemental content is available, cause the web browser extension to present an indicator that the supplemental content is available; obtain the supplemental content corresponding to the broadcasted media content item, wherein each piece of the supplemental content is associated with timing information of the broadcasted media content item; and cause a portion of the obtained supplemental content to be presented concurrently with the media content item in response to detecting that the indicator has been selected, wherein the portion of the obtain supplemental content is selected based on current timing information of the media content item currently being provided by the content provider.

In accordance with some implementations of the disclosed subject matter, a non-transitory computer-readable medium containing computer executable instructions that, when executed by a processor, cause the processor to perform a method for providing information relating to media content is provided. The method comprising: receiving an indication from a web browser extension executing within a web browsing application that a media content item is being presented on a content provider website; identifying the media content item being presented on the content provider website by determining whether the media content item presented by the content provider website has also been previously broadcasted by a television provider and associating the media content item with a broadcasted media content item provided by the television provider; determining whether supplemental content associated with the broadcasted media content item is available; in response to determining that the supplemental content is available, causing the web browser extension to present an indicator that the supplemental content is available; obtaining the supplemental content corresponding to the broadcasted media content item, wherein each piece of the supplemental content is associated with timing information of the broadcasted media content item; and causing a portion of the obtained supplemental content to be presented concurrently with the media content item in response to detecting that the indicator has been selected, wherein the portion of the obtain supplemental content is selected based on current timing information of the media content item currently being provided by the content provider.

In accordance with some implementations of the disclosed subject matter, a system for providing information relating to media content is provided, the system comprising: means for receiving an indication from a web browser extension executing within a web browsing application that a media content item is being presented on a content provider website; means for identifying the media content item being presented on the content provider website by determining whether the media content item presented by the content provider website has also been previously broadcasted by a television provider and associating the media content item with a broadcasted media content item provided by the television provider; means for determining whether supplemental content associated with the broadcasted media content item is available; in response to determining that the supplemental content is available, means for causing the web browser extension to present an indicator that the supplemental content is available; means for obtaining the supplemental content corresponding to the broadcasted media content item, wherein each piece of the supplemental content is associated with timing information of the broadcasted media content item; and means for causing a portion of the obtained supplemental content to be presented concurrently with the media content item in response to detecting that the indicator has been selected, wherein the portion of the obtain supplemental content is selected based on current timing information of the media content item currently being provided by the content provider.

In some implementations, the system further comprises means for comparing media content information received from the web browser extension with guidance information from the television provider.

In some implementations, the system further comprises means for determining whether a uniform resource locator associated with the content provider website is included on a list of uniform resource locators.

In some implementations, the system further comprises: means for extracting media information from the media content item being presented on the content provider website; means for generating a fingerprint from at least a portion of the extracted media information that corresponds to a portion of the media content item; and means for determining whether the fingerprint of the portion of the media content item being presented on the content provider website matches one of a plurality of fingerprints associated with the media content item from an internal video database, wherein each of the plurality of fingerprints has a timestamp associated with a portion of the media content item.

In some implementations, the supplemental content is retrieved from a data source that is indexed by at least the media content item and timing information.

In some implementations, the indicator is presented within an address bar of the web browsing application.

In some implementations, the system further comprises: means for determining whether an updated fingerprint of the media content item being presented on the content provider website matches one of a plurality of fingerprints associated with the media content item from an internal video database; and means for determining a timestamp associated with the media content item.

In some implementations, the system further comprises means for determining which of the obtained supplemental content to transmit to the web browser extension based on the timestamp.

In some implementations, the system further comprises: means for receiving the current timing information of the media content item from a media player on the content provider website; and means for determining which of the obtained supplemental content to transmit to the web browser extension based on the current timing information.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
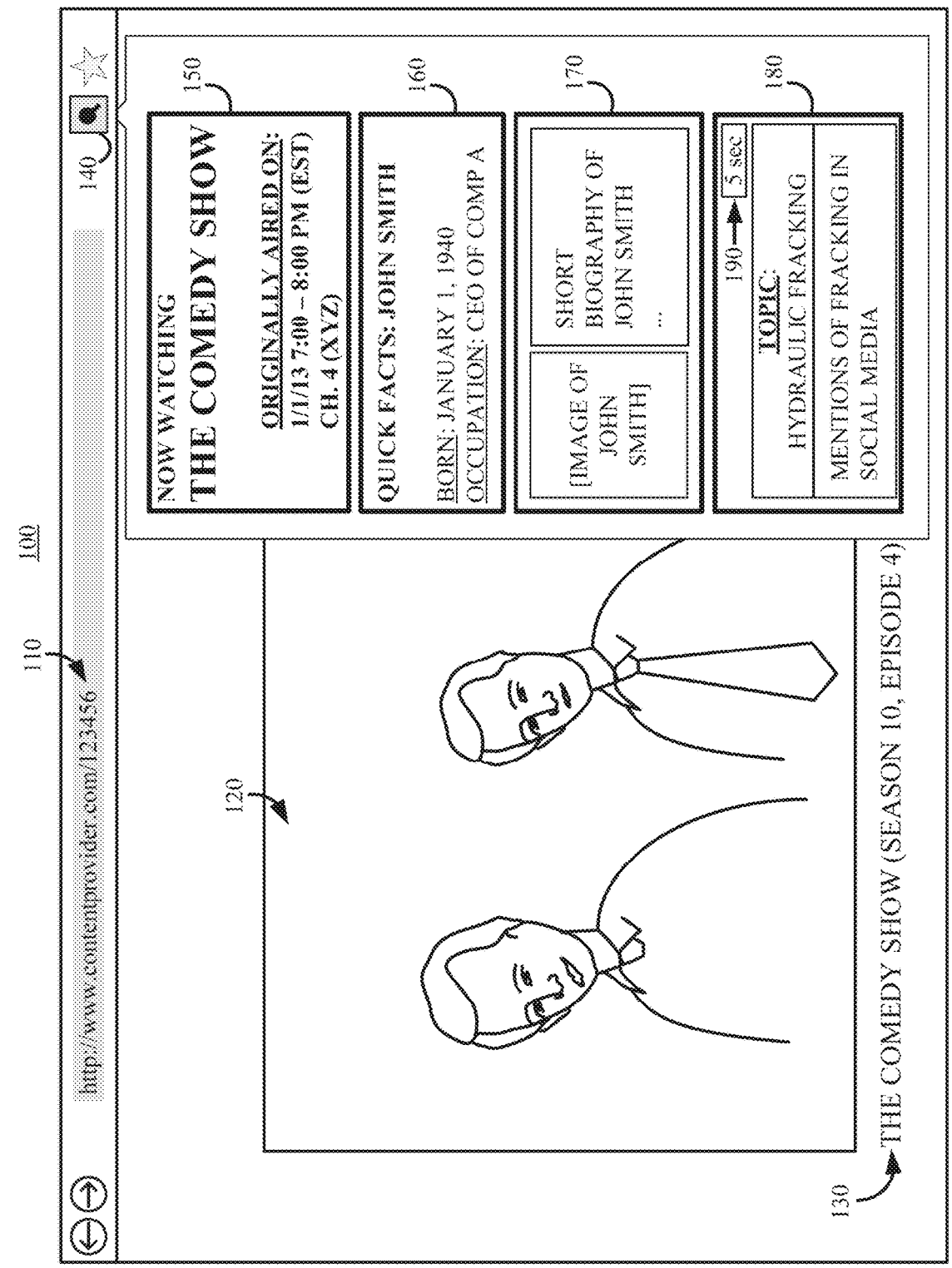
FIG. 1 shows an illustrative example of a content provider website that provides media content, such as a television program, where supplemental content that relates to the television program is provided through a web browser extension in accordance with some implementations of the disclosed subject matter.

In accordance with various implementations, as described in more detail below, mechanisms, which can include methods, systems, and computer-readable media, for presenting supplemental information corresponding to on-demand media content are provided.

In some implementations, the supplemental information presented for an on-demand media program, such as an on-demand television program presented on a streaming media website, can be based on information extracted from a corresponding program that has been broadcasted by a television provider.

In accordance with some implementations, the mechanisms can include determining whether to present supplemental information. For example, the mechanisms can be implemented as a web browser extension executing on a web browsing application that accesses the streaming media website, where the web browser extension processes the webpage providing the on-demand media program, identifies the on-demand media program selected for play back, and determines whether supplemental information associated with the on-demand media program is available. In a more particular example, the mechanisms can determine whether the identified on-demand media program is associated with a program that was broadcasted by a television program (e.g., by associating an episode of a television program provided by an on-demand content provider with the same episode of the television program that was provided by a television provider), where the television program has supplemental content associated with it. In response to determining that such supplemental information is available, the mechanisms can obtain the supplemental information from one or more data sources relating to the program provided by the television provider and provide an availability indicator using the web browser extension.

It should be noted that the supplemental information can include any suitable information relating to the program. For example, supplemental information can include extracted keywords mentioned in subtitle information of the program, links to articles relating to one or more of the extracted keywords, text snippets of documents relating to one or more of the extracted keywords, selectable links to on-screen text (e.g., uniform resource locators (URLs), phone numbers, hashtags, etc.), identified product logos, faces, and/or famous places and links to related documents, identified songs and links to sources for listening and/or purchasing such songs, identified topics of discussion and links to news articles or other suitable documents discussing the identified topic, etc.

In some implementations, the mechanisms can present the supplemental information in response to receiving an indication that the availability indicator has been selected. For example, the mechanisms can present the supplemental information relating to the on-demand program in a window displayed on the side of the on-demand program as it is being played back. In another example, the supplemental information can be provided within a window that overlays a video window presenting the on-demand program. In yet another example, the supplemental information can be provided as a transparency, where the supplemental information can be overlaid on a video window presenting the on-demand program without inhibiting the viewability of the on-demand program.

In some implementations, supplemental information for on-demand media content can be presented on one or more cards, where a card is a user interface which can present information to a user. In some implementations, a user can interact with the card, for example, by indicating that the user viewed and liked the supplemental information on the card. In another example, a user can cause the card to be removed to indicate a lack of interest in the supplemental information. A card can be presented on a user interface on any suitable user device (e.g., a mobile phone, a tablet computer, a desktop computer, or any other suitable user device).

In some implementations, the mechanisms can present supplemental information that is contextually relevant to the presented on-demand media content. For example, the mechanisms can determine the playback position of the on-demand media program and present supplemental information based on the particular playback position within the on-demand media program. In a more particular example, the mechanisms can enter a synchronization mode, where audio and/or image fingerprints are extracted and compared with fingerprints of the corresponding program that has been broadcast by a television provider. In response, synchronization data can be generated that includes the particular playback position within the program. Such synchronization data can be used to present particular pieces of contextually relevant information at particular times during the playback of the on-demand media program. For example, supplemental information relating to the program, such as guidance information, episode information, and general program information, can be presented at the start of the program, while supplemental information relating to a particular topic can be presented when that particular topic is being discussed within the on-demand program.

It should be noted that, although the implementations described herein generally relate to providing supplemental information corresponding to on-demand media content, this is merely illustrative. The mechanisms can be implemented to provide supplemental information with any suitable media content provided by an over-the-top (OTT) content source, a video-on-demand (VOD) content source, streaming media content sources, and/or any other suitable source.

It should also be noted that, although the implementations described herein generally relate to providing supplemental information based on information extracted from a corresponding program that has been broadcasted by a television provider, this is merely illustrative. Additionally or alternatively, it can be determined whether an on-demand media program is associated with media content from any suitable database of media content. For example, videos from one or more of these media databases can be processed to generate fingerprints and/or extract supplemental information. In response to determining that the on-demand media program presented on a streaming media website corresponds to a video from an internal media database, the supplemental information can be provided.

These mechanisms can be used in a variety of applications. For example, these mechanisms can be used to provide supplemental information on one or more websites that provide on-demand content. In a more particular example, these mechanisms can be used to determine the context of the position in the program that a user is currently watching and present supplemental information that is relevant to the context of the current position in the program. In another more particular example, these mechanisms can be used to provide an application that presents supplemental information to users that are consuming video content, where the supplemental information is contextually relevant to the video content and where the video content is not available to the application (e.g., content that is provided via a proprietary delivery platform).

Turning to FIG. 1, FIG. 1 shows an example of a web browsing application that, in response to accessing a particular page 100 having a URL 110, displays a program or other suitable media content 120 and supplemental information 150, 160, 170, and/or 180 in accordance with some implementations of the disclosed subject matter. More particularly, as shown in FIG. 1, in response to selecting a particular episode of an on-demand program (e.g., Episode 4 from Season 10 of "The Comedy Show"), a web browser extension executing on the web browsing application can process the page 100 providing the on-demand program 120 and determine whether supplemental information is available to be presented to the user.

In response to determining that supplemental information is available to the user, an availability indicator 140 or any other suitable indication that indicates supplemental information is available can be provided to the user. As shown in FIG. 1, availability indicator 140 can be provided within the address bar of the web browsing application. Alternatively, availability indicator 140 can be presented in any suitable location, such as a pop-up window, a notification area, etc. In response to selecting availability indicator 140, supplemental information corresponding to the on-demand program 120 can be presented to the user. More particularly, supplemental information in the form of cards 150, 160, 170, and/or 180 can be presented, where each individual card (e.g., cards 150, 160, 170, and 180) can be relevant to the context of the current position in the on-demand program 120. For example, an individual card can present guidance information relating to the on-demand program (e.g., program information, episode information, previous broadcast information, etc.), as shown in card 150. In another example, an individual card can present text snippets relating to a product logo, face, and/or famous place that appears in the on-demand program (e.g., facts relating to a person appearing at that playback position in Episode 4 from Season 10 of "The Comedy Show"), as shown in card 160. Similarly, an individual card can present a portion of web content relating to a product logo, face, and/or famous place that appears in the on-demand program (e.g., a portion of a webpage include a biography and images relating to a person appearing at that playback position in Episode 4 from Season 10 of "The Comedy Show"), as shown in card 170. In yet another example, as shown in card 180, an individual card can present news articles, social media messages, or other information relating to a topic being discussed at that playback position in Episode 4 from Season 10 of "The Comedy Show."

It should be noted that the supplemental information in cards 150, 160, 170, and/or 180 can be any suitable representation of supplemental information, such as a snippet of supplemental information (e.g., a quick fact or any other suitable text snippet), a thumbnail image, a link or uniform resource locator (URL) to additional content, an extracted keyword mentioned in subtitle information, an extracted topic discussed in the program, an identified song where at least a portion of the song was played back in the program, other songs from an artist having at least a portion of a song played back in the program, etc.

In some implementations, timing information 190 can be included with an individual card (e.g., one of cards 150, 160, 170, and 180). For example, as shown in FIG. 1, card 180 can include timing information 190 that indicates which specific content that card 180 refers or relates to. More particularly, card 180 can include timing information 190 that states "Mentioned 5 minutes ago" or "5 minutes" such that the user viewing timing information 190 knows that the card may not pertain to something occurring exactly at the current time, but something that occurred recently. In another example, card 180 can include timing information that indicates how long card 180 will remain to be presented. Upon the time displayed in indicator 190 elapsing, another card that presents information relevant to the context of the playback position of on-demand program 120 can be provided. Alternatively, card 180 can be removed from page 100.

It should be noted that supplemental information in cards 150, 160, 170, and/or 180 can be presented in any suitable manner. For example, as shown in FIG. 1, the supplemental information in cards 150, 160, 170, and/or 180 can be provided within a window that overlays a video window presenting on-demand program 120. In another example, the supplemental information in card 150, 160, 170, and/or 180 can be provided as a transparency, where the supplemental information can be overlaid on the video window presenting on-demand program 120 without inhibiting the viewability of on-demand program 120. In yet another example, the supplemental information in cards 150, 160, 170, and/or 180 can be provided in a window positioned adjacent to the video window presenting on-demand program 120.

The presentation of supplemental information as cards can include presentation of any suitable images, icons, graphics, videos, animations, sounds, haptic feedback, or any other suitable accompanying content. For example, in some implementations, presentation of a card can include presenting an accompanying sound (e.g., a tone, a verbal description of the card content, or any other sounds) or accompanying haptic feedback (e.g., vibration of a user device). It should be noted that, although there are four cards 150, 160, 170, and 180 shown in FIG. 1, any suitable number of cards (including none) can be presented to a user.

In some implementations, in addition to presenting on-demand program 120, page 100 can include any other suitable information. For example, page 100 can also include program information 130, such as program title, episode title, season number, episode number, original air date, channel information, channel identifier information, and/or detailed information associated with on-demand program 120. In another example, page 100 can also include comments provided by users that consumed on-demand program 120, an indication as to the number of viewers that provide a positive recommendation of on-demand program 120, links for sharing on-demand program 120 with other users, and/or any other suitable social media-related information. In yet another example, page 100 can include any suitable logo, such as a logo associated with the on-demand content provider or a logo associated with a channel that the program was originally aired. It should be noted that page 100 can include any suitable text, graphics, images, video, or any other suitable content in accordance with some implementations. In some implementations, information 130, such as a logo, can be omitted from page 100.

Although not shown in FIG. 1, in some implementations, the supplemental content presented in cards can be interacted with by a user. For example, a card can be removed from page 100 if a user is not interested or is no longer interested in the supplemental information presented on the card. As another example, a card can be selected to perform an action or present additional information (e.g., access a link to review an article relating to the context of the on-demand program). As a more particular example, if a card which displays a portion of a document including actor information is presented, the card can be selected, and in response, an action can be performed, for example, launching a web browsing application that accesses the page with the document containing actor information. Cards can be interacted with in any suitable way. For example, in some implementations, cards can be dismissed by clicking or tapping on the card or on a "dismiss" icon (e.g., an "X" at the corner of the card or any other suitable icon). As another particular example, in some implementations, cards can be dismissed by swiping or dragging the card off the border of page 100. Similarly, cards can be selected by clicking, tapping, or any other suitable mechanism.

Figure 2:
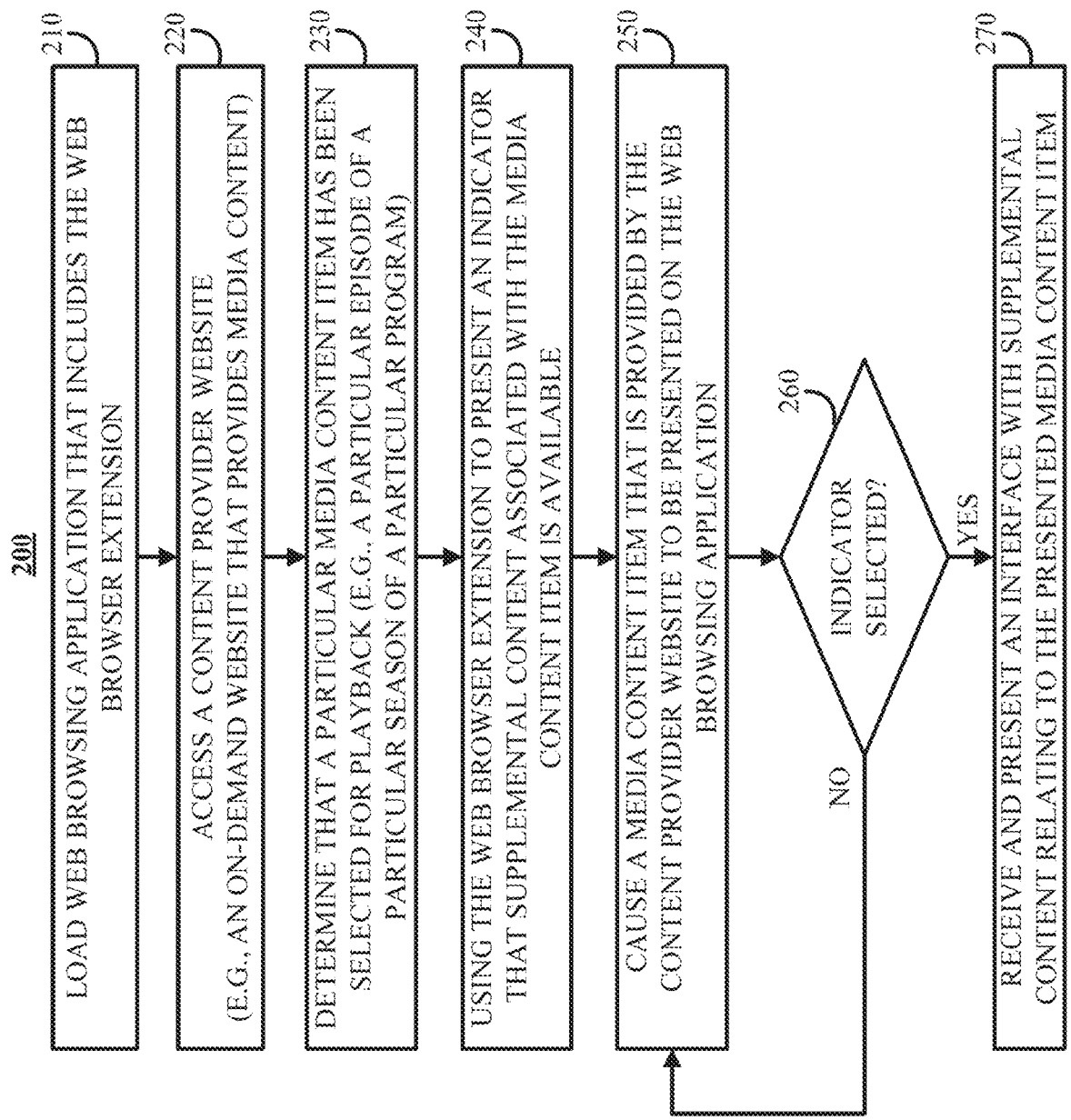
FIG. 2 shows an illustrative example of a process for selecting media content for playback on a content provider website and presenting supplemental content that is contextually relevant to the presented media content in accordance with some implementations of the disclosed subject matter.

Turning to FIG. 2, an illustrative example 200 of a process for presenting supplemental content is shown in accordance with some implementations of the disclosed subject matter.

At 210, a computing device can load a web browsing application that includes a web browser extension for presenting supplemental content. For example, the computing device can be a desktop computer, a laptop computer, a cellular telephone, a smartphone, a tablet computing device, a wearable computing device, a gaming device, etc.

At 220, the web browsing application can be used to access a content provider website. The content provider website can be any suitable on-demand content provider, steaming media content provider, etc. For example, in response to accessing the content provider website, the content provider website can provide the user with an opportunity to select one or more of the media content items for playback. It should be noted the media content items can include one or more programs from various sources, such as on-demand programs, Internet content, streaming programs, etc.

At 230, the web browsing application, using the web browser extension, can determine that a particular media content item has been selected for playback. For example, in response to browsing through available media content items on a content provider website, the web browsing application can determine that the user has selected a particular episode of a particular season of a particular program for on-demand playback on the content provider website. In a more particular example, the particular episode of the particular season of the particular on-demand program can be a program that was previously broadcasted over-the-air, broadcasted by a cable television provider, broadcasted by a telephone television provider, and/or broadcasted by a satellite television provider.

In some implementations, the web browser extension executing on the web browsing application can enter a media content detection mode, which can begin by processing the page that plays back the media content item on the content provider website and obtaining media content information corresponding to the media content item being presented.

In some implementations, the media content information can include an audio sample of the on-demand media content currently being presented. For example, the web browsing application can activate an audio input device coupled to the computing device, such as a microphone, where the audio input device captures and records the audio sample or any other suitable audio data associated with a presented on-demand program. In another example, the web browsing application can receive a user indication to store audio data for transmission to an audio matching service.

In some implementations, the web browsing application can activate an audio input device that captures audio from its surroundings and uses appropriates filters and/or other audio enhancements to extract an audio fingerprint or filtered audio data associated with the presented on-demand program. For example, silent portions of the audio sample can be removed to reduce the file size of the audio sample. In another example, portions of the audio sample having distortion can be removed to reduce the file size of the audio sample. In yet another example, in response to determining that at least a portion of the audio sample does not include audio data having a given quality, the web browsing application can prompt the user of the web browsing application to record another audio sample.

In some implementations, the web browsing application executing on the computing device can generate an audio fingerprint of the audio sample using any suitable audio fingerprinting technique at 230. The audio fingerprint can be a digital representation generated from the received audio sample, where the audio fingerprint can be used to identify the same or similar portions of audio data. Alternatively, the web browsing application can transmit the audio sample associated with the program to a search system or an audio matching system that generates an audio fingerprint.

In some implementations, the web browsing application can transmit the obtained audio sample and/or the audio fingerprint for analysis. For example, upon selecting a media content item for playback using the web browsing application and activating the audio input device, the web browsing application can automatically stream the audio sample and/or the audio fingerprint to a search system that accesses a matching service (e.g., an audio fingerprint matching service). As described above, the web browsing application can stream the audio sample to a search system, where the search system generates an audio fingerprint corresponding to the audio sample and transmits the audio fingerprint to an audio fingerprint matching service for analysis.

Additionally or alternatively, the media content information can also include a video sample of the on-demand content currently being presented. For example, the web browsing application can capture a video sample or any other suitable video data associated with a presented on-demand program. In another example, the web browsing application can receive a user indication to store video data for transmission to a video matching service.

In some implementations, the web browsing application executing on the computing device can generate a video fingerprint of the video sample using any suitable video fingerprinting technique. The video fingerprint can be a digital representation generated from the received video sample, where the video fingerprint can be used to identify the same or similar portions of video data. Alternatively, the web browsing application can transmit the video sample associated with the program to a search system or a video matching system that generates a video fingerprint.

In some implementations, the web browsing application can transmit the obtained video sample and/or the video fingerprint for analysis. For example, upon selecting a media content item for playback using the web browsing application, the web browsing application can automatically stream the video sample and/or the video fingerprint to a search system that accesses a matching service (e.g., a video fingerprint matching service). As described above, the web browsing application can stream the video sample to a search system, where the search system generates a video fingerprint corresponding to the video sample and transmits the video fingerprint to a video fingerprint matching service for analysis.

Additionally or alternatively, the media content information can also include one or more screenshots of the on-demand content currently being presented. For example, the web browsing application can capture a screenshot associated with a presented on-demand program. In another example, the web browsing application can receive a user indication to store screenshots for transmission to an image matching service.

In some implementations, additional information can be transmitted along with the audio sample, the video sample, and/or the image sample, such as client device information, user profile information, location information, user preferences, timing information, and other information that can be used to generate a search query associated with the sample of the on-demand program.

It should be noted that in implementations described herein in which the web browsing application or any other suitable client application (or other mechanisms described herein) collects information about a particular user, the user can be provided with an opportunity to control whether the application collects information about particular users and/or how collected user information is used by the application. Examples of information about a user can include the user's interests and identifying information of the user (e.g., a user profile, user credentials, device identification, etc.). Additionally, certain information about the user can be stored locally (e.g., not shared), encrypted, and/or treated in one or more ways before it is stored to remove personally identifiable information. For example, the application can store user preferences and/or user interests for a particular user with an anonymous user identifier (e.g., a user identifier that is not associated with the user's name, the user's username and/or password, the user's email address, etc.). Using these techniques, the user can have control over what information is collected about the user and/or how that information is used by the application.

Figure 3:
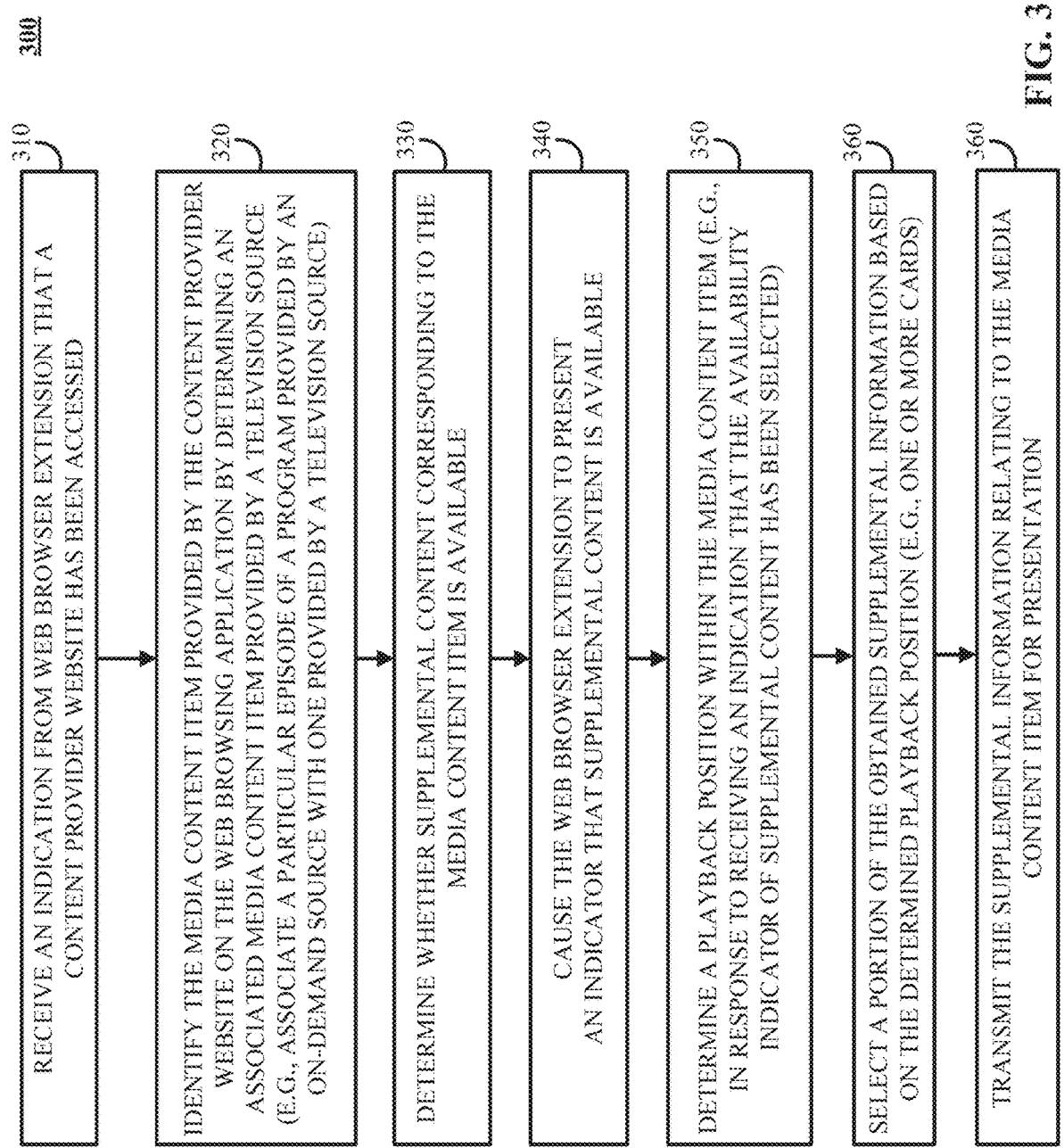
FIG. 3 shows an illustrative example of a process for determining media content presented by a content provider website and selecting supplemental content that is contextually relevant to the presented media content in accordance with some implementations of the disclosed subject matter.

Turning to FIG. 3, upon receiving an indication from the web browsing application or the web browser extension that a content provider website has been accessed and receiving the sample and/or other additional information at 310, the search system can identify the media content item being provided by the content provider website on the web browsing application at 320.

Generally speaking, the search system can identify the media content item being provided by the content provider website by determining an associated media content item that has been provided by one or more television sources. For example, the search system can use the received media content information to associate the on-demand program being provided by the on-demand source to a program provided by a television source. In a more particular example, the received media content information associated with the on-demand program can be compared with media content information associated with television programs provided by one or more television providers (e.g., a cable television provider, a telephone television provider, a satellite television provider, etc.).

It should be noted that, in some implementations, prior to identifying the media content item, the search system can verify whether the content provider website is included on a list of particular content provider websites. For example, in response to determining that the particular content provider website accessed by a user using the web browsing application is not included on the list of particular content provider websites (e.g., not approved for providing supplemental content items), the search system can inhibit the processing of information from such web browsing applications. In another example, in response to determining that the particular content provider website accessed by a user using the web browsing application is not included on the list of particular content provider websites (e.g., not approved for providing supplemental content items), the search system can cause the web browser extension or any other suitable client application to inform the user using the web browsing application that the presentation of supplemental content items is not supported.

In some implementations, a fingerprint of the received sample can be generated. For example, an audio fingerprint of the received audio sample or a video fingerprint of the received video sample can be generated. Again, the fingerprint can be generated by the web browsing application or any other suitable application and transmitted to the search system or a fingerprint matching system for analysis.

The search system can then compare the generated fingerprint to multiple fingerprints. For example, the generated audio fingerprint associated with the audio sample from the web browsing application can be compared against a subset of stored audio fingerprints. In another example, the generated audio fingerprint associated with the audio sample from the on-demand program can be compared against live television program audio fingerprints that are stored and indexed by program in a database. In a more particular example, the search system can access a database or other suitable storage device containing multiple audio fingerprints and filter the multiple audio fingerprints to a subset of audio fingerprints based on location information, user preferences, and other information received from the web browsing application. In this example, only audio fingerprints associated with the received location information can be used to compare with the generated audio fingerprint. In another example, particular audio fingerprints from the database or storage device can be used for comparison before others, such as audio fingerprints associated with popular channels, newer audio fingerprints, audio fingerprints commonly matched, etc.

In some implementations, the search system can, for example, include capture modules that receive and process signals from multiple sources. These capture modules can, for each channel, capture video screenshots at particular time intervals (e.g., every two or three seconds) and/or generate audio fingerprints from audio data at particular time intervals. Generally speaking, these capture modules can monitor media content from multiple content sources and generate video screenshots, audio fingerprints, and/or any other suitable content identifier. More particularly, these capture modules can store the generated video screenshots, audio fingerprints, and other content identifiers in a storage device. For example, a capture module can monitor channels providing broadcast television content and store generated audio fingerprints in a database that is indexed by channel and time.

It should be noted that, in some implementations, generated video screenshots, audio fingerprints, and other content identifiers indexed by channel and time in a database can be discarded after a predetermined time. For example, in response to determining that a video screenshot is associated with a time outside of a particular time window, the search system or any other suitable component can remove the video screenshot from the database.

In some implementations, it can be determined whether a match is found. If no matching audio fingerprint is found, the search system can wait to receive additional audio samples from the web browsing application. Additionally or alternatively, the search system can transmit a message to the web browsing application requesting that the user restart the web browsing application, transmit another audio sample, and/or input or verify particular information (e.g., program information, such as channel number, service provider information, program title, etc.).

In response to identifying a fingerprint match, the search system can identify a media content item or any other suitable content identifier associated with the matched fingerprint. For example, a matching audio fingerprint can be associated with a particular episode of a particular program (e.g., Episode 4 from Season 10 of "The Comedy Show" program in FIG. 1) and the search system can use this association to determine that the user of web browsing application is watching a television program that was previously aired on a channel by a television provider. In another example, the search system can transmit a notification to the web browsing application that the media content item has been identified. This notification can include, for example, an indication that the search system has successfully identified the media content item from the received audio sample. In some implementations, in response to the user of the web browsing application determining that the identified media content item is incorrect, the web browsing application can provide the user with an opportunity to indicate the correct media content item or transmit another audio, video, and/or image sample.

It should be noted that, in some implementations, the web browsing application can initiate the media content detection mode without capturing audio information, video information, image information, or using fingerprints (e.g., step 230 of FIG. 2 and step 320 of FIG. 3). For example, in response to detecting that the user has selected an on-demand media content item for playback on a content provider website, the web browsing application can obtain media content information associated with the on-demand media content item, such as program title, episode number, episode title, series number, summary of content, creator information, publisher information, original air date, duration information, etc. In response to obtaining such media content information and transmitting the media content information to the search system, the search system can determine whether one or more pieces of the media content information match a program that has been broadcast by a television provider. For example, the episode number and the program title can be used to associate the on-demand program with a particular episode of a television program that was broadcasted by a television provider. In another example, the search system can obtain the media content information by analyzing the video player on the content provider website that is playing back the media content item.

Additionally or alternatively, the search system can identify the media content item being provided by the content provider website by determining that the media content item matches a media content item from any suitable media database. For example, the media content items stored in a media database can be processed and one or more fingerprints can be generated from the stored media content items. The search system can determine whether a fingerprint of the sample received from the web browsing application matches a fingerprint of a media content item in a suitable media database. In another example, the search system can transmit a query to an internal media database that includes the fingerprint or any other suitable sample of the content provided on the web browsing application, where the internal media database can respond with information that identifies the media content item.

In response to identifying the media content item and determining that the on-demand media content item is associated with a media content item that was previously broadcasted by a television provider, the search system can determine whether supplemental content corresponding to the previously broadcasted media content item is available at 330.

As described above, the search system can, for example, include capture modules that receive and process signals from multiple sources (e.g., multiple television channels including television programs that are broadcasted by one or more television providers). These capture modules can, for each channel, process the provided television programs. For example, in response to receiving frames (e.g., frames of live television program), these capture modules can process the frames to determine whether at least one of the frames includes an object of interest using one or more of: an object recognition technique to identify objects, landmarks, places, etc. that are shown in a frame, a facial recognition technique to identify faces of actors, actresses, and/or characters that appear in a frame, and/or optical character recognition to identify text portions, such as a telephone number, a website address, a business name, a product name, etc. In another example, these capture modules can extract keywords and/or entity information that is included in subtitle information corresponding to the program. In yet another example, these capture modules can determine topics that are being discussed in a program (e.g., by processing audio data and/or an audio fingerprint). In a further example, these capture modules can identify a song that is played in a program (e.g., by processing audio data and/or an audio fingerprint). Upon performing this analysis, the object of interest can be associated with a content item. For example, the content item can include a selectable link that can be associated with an identified text portion that includes a website address or a business name. In another example, the content item can be a selectable link or a text snippet corresponding to a news article, web content, or any other suitable content that discusses an extracted keyword or an identified topic. In yet another example, the content item can be a selectable link directed to a music provider for playing and/or purchasing the identified song in the program.

In some implementations, these capture modules can store the content items as supplemental content items in a storage device. For example, a capture module can monitor channels providing broadcast television content and store supplemental content in a database that is indexed by program and time. In a more particular example, a capture module can store supplemental content along with timestamped audio and image fingerprints for every N millisecond in a database while a program is being broadcasted by a television provider.

Referring back to 330, in response to determining whether supplemental content corresponding to the media content item is available, the search system can determine whether supplemental content corresponding to the previously broadcasted media content item is available and obtain supplemental content from such a database. For example, in response to determining that the particular episode of "The Comedy Show" shown in FIG. 1 is associated with a previously broadcasted television program and that supplemental content was generated by one or more capture modules, the search system can access the portion of the database corresponding to the particular episode of "The Comedy Show" and obtain the supplemental content. In a more particular example, the supplemental content corresponding to the particular episode of the program can be timestamped to relate to particular portions of the program.

Alternatively, the search system can instruct the web browser extension or any other suitable client application to obtain supplemental content corresponding to the broadcasted media content item from one or more servers (e.g., capture servers). In response, the supplemental content can be locally stored in a suitable storage device associated with the computing device.

Additionally or alternatively, the search system can process media content items stored in an internal media database such that supplemental information is extracted from the media content items. Such supplemental information can be presented to a user viewing an on-demand video of the same content using a web browsing application.

At 340, the search system can cause the web browser extension or any other suitable client application to present an indicator that supplemental content is available. An example of the availability indicator (e.g., availability indicator 140) is shown, for example, in FIG. 1. Referring back to FIG. 2, in response to presenting an indicator that supplemental content associated with the selected media content item is available at 240, the web browsing application can cause the media content item that is provided by the content provider website to be presented at 250. For example, the web browsing application can being playback of the selected media content item.

Upon presenting the media content item, the web browsing application can detect whether a user has selected the availability indicator at 260. For example, the web browsing application can transmit an indication that the user has selected the availability indicator to the search system. In response, the web browsing application can receive and present one or more interfaces including supplemental content relating to the presented media content item at 270. For example, as shown in FIG. 1, cards 150, 160, 170, and/or 180 including supplemental information can be presented to the user while viewing the selected media content item.

It should be noted that, in some implementations, the web browsing application can provide a user-selectable option for presenting supplemental content upon determining that such supplemental content is available. For example, in response to determining that supplemental content for a television program that was broadcasted by a television provider corresponding to the selected on-demand program is available, the web browsing application can, using the web browser extension, automatically present the supplemental content concurrently while presenting the on-demand program. In a more particular example, the web browsing application can, using the web browser extension, automatically update the supplemental content to be contextually relevant to content presented in the on-demand program.

Referring back to FIG. 3, in some implementations, the search system can enter a synchronization mode upon determining that supplemental content is available for the on-demand program.

At 350, in response to causing an indicator that supplemental content is available to be presented and obtaining such supplemental content, the search system can enter a synchronization mode that awaits the user to begin playback of the selected on-demand media content item (e.g., the on-demand episode of "The Comedy Show in FIG. 1). For example, the search system can determine a particular playback point in the episode of the on-demand program that is being presented to the user. In a more particular example, as described above, the web browsing application can transmit media content information to identify the particular playback point in the on-demand program.

In some implementations, the media content information can include an audio sample of the on-demand media content currently being presented. For example, the web browsing application can activate an audio input device coupled to the computing device, such as a microphone, where the audio input device captures and records the audio sample or any other suitable audio data associated with a presented on-demand program. In another example, the web browsing application can receive a user indication to store audio data at a particular point in the presentation of the on-demand media content item for transmission to an audio matching service.

In some implementations, the web browsing application executing on the computing device can generate an audio fingerprint of the audio sample using any suitable audio fingerprinting technique. The audio fingerprint can be a digital representation generated from the received audio sample, where the audio fingerprint can be used to identify the same or similar portions of audio data. Alternatively, the web browsing application can transmit the audio sample associated with the program to a search system or an audio matching system that generates an audio fingerprint.

In some implementations, the web browsing application can transmit the obtained audio sample and/or the audio fingerprint for analysis. For example, the web browsing application can transmit the audio sample and/or the audio fingerprint to a search system that accesses a matching service (e.g., an audio fingerprint matching service). As described above, the web browsing application can stream the audio sample to a search system, where the search system generates an audio fingerprint corresponding to the audio sample and transmits the audio fingerprint to an audio fingerprint matching service for analysis.

Additionally or alternatively, the media content information can also include a video sample of the on-demand content currently being presented. For example, the web browsing application can capture a video sample or any other suitable video data associated with a presented on-demand program. In another example, the web browsing application can receive a user indication to store video data at a particular point in the presentation of the on-demand media content item for transmission to a video matching service.

In some implementations, the web browsing application executing on the computing device can generate a video fingerprint of the video sample using any suitable video fingerprinting technique. The video fingerprint can be a digital representation generated from the received video sample, where the video fingerprint can be used to identify the same or similar portions of video data. Alternatively, the web browsing application can transmit the video sample associated with the program to a search system or a video matching system that generates a video fingerprint.

In some implementations, the web browsing application can transmit the obtained video sample and/or the video fingerprint for analysis. For example, the web browsing application can transmit the video sample and/or the video fingerprint to a search system that accesses a matching service (e.g., a video fingerprint matching service). As described above, the web browsing application can stream the video sample to a search system, where the search system generates a video fingerprint corresponding to the video sample and transmits the video fingerprint to a video fingerprint matching service for analysis.

Additionally or alternatively, the media content information can also include one or more screenshots of the on-demand content currently being presented. For example, the web browsing application can capture a screenshot associated with a presented on-demand program. In another example, the web browsing application can receive a user indication to store screenshots for transmission to an image matching service.

Upon receiving an audio fingerprint, a video fingerprint, a screenshot, or any suitable media content information, the search system can then compare the generated fingerprint to multiple fingerprints. For example, the generated audio fingerprint associated with the audio sample from the web browsing application can be compared against a subset of stored audio fingerprints. In another example, the generated audio fingerprint associated with the audio sample from the on-demand program can be compared against live television program audio fingerprints that are stored and indexed by program in a database. Similarly, the generated video fingerprint associated with the video sample from the web browsing application can be compared against a subset of stored video fingerprints captured from broadcasted television programs. In yet another example, a screenshot of the on-demand program from the web browsing application can be compared against live television program screenshots that are stored and indexed by program in a database. In response to determining that the received audio fingerprint, video fingerprint, and/or screenshot matches information stored in one or more databases, the search system can obtain information from the matching fingerprint and determine the playback position or time offset of the on-demand program. For example, particular media information associated with a fingerprint of a previously broadcasted television program can provide timing information, such as a time frame (e.g., between 0:12 minutes and 0:13 minutes), a time offset (e.g., 10 minutes and 3 seconds from the start of the program), etc.

In some implementations, a video sample, a screenshot, or a video fingerprint can include a portion of the video player provided by the content provider website. In this implementation, the search system can determine the playback position by processing the image data of the video player. For example, the search system can analyze the image data of the video player to extract timing information from the video player. Alternatively, the search system can receive information relating to the video player on the content provider website that is playing back the on-demand media content item. In response, the search system can extract playback position or any other suitable timing information from such information.

In some implementations, the search system can transmit a query to the video player provided by the content provider website that requests the playback position or any other suitable timing information. In response to the query, the video player or any other suitable portion of the content provider website can provide a response message that includes the current playback position, the time offset, or any other suitable timing parameter.

Referring back to FIG. 3, in response to determining a particular playback position or other suitable timing information at 350, the search system can select suitable portions of supplemental information for presentation at 360 and transmit the supplemental information to the web browser extension at 370. For example, timing information or any other suitable synchronization data can be used to determine a particular playback position of the on-demand program and then determine which piece of supplemental content from the associated broadcasted program relates to that particular playback position. In a more particular example, as shown in FIG. 1, in response to determining that the episode of "The Comedy Show" is ten minutes into the program, the search system can obtain cards 150, 160, 170, and/or 180 that include supplemental information that is contextually relevant to that particular playback position of the program. The guest speaker in the on-demand program may be "John Smith" and the topic of conversation in the on-demand program may be "hydraulic fracking." In response, cards 160 and 170 that provide text snippets relating to "John Smith" and card 180 that provides social media snippets relating to the topic "hydraulic fracking" can be presented to the user of the web browsing application.

In some implementations, the search system can obtain all of the supplemental content items associated with that particular playback position for that particular episode of the previously broadcasted television program corresponding to the on-demand program currently being played back. In a more particular implementation, the search system can query one or more databases that contain supplemental content items for programs broadcasted by a television provider, where the query includes particular timing information, episode information, and/or program information. In response, the search system can receive links to corresponding supplemental content items. The search system can then transmit the supplemental content items to the web browsing application on the computing device for presentation. Alternatively, the search system can select a subset of the supplemental content items for presentation for a particular period of time and, in response to that period of time elapsing, select another subset of the supplemental content items for presentation. It should be noted that, in some implementations, selection of the number of supplemental content items can depend on multiple criterion, such as device type (e.g., desktop computing device, mobile device, etc.), display size (e.g., LCD display device, tablet computing device, mobile device, etc.), network connection, etc.

It should be noted that, in some implementations, the web browsing application can continuously and/or periodically transmit an audio sample, a video sample, a screenshot, a fingerprint, or any other suitable media data relating to an on-demand program being presented to the search system. In response, the web browsing application can be provided with updated supplemental content for presentation and/or selection.

Figure 4:
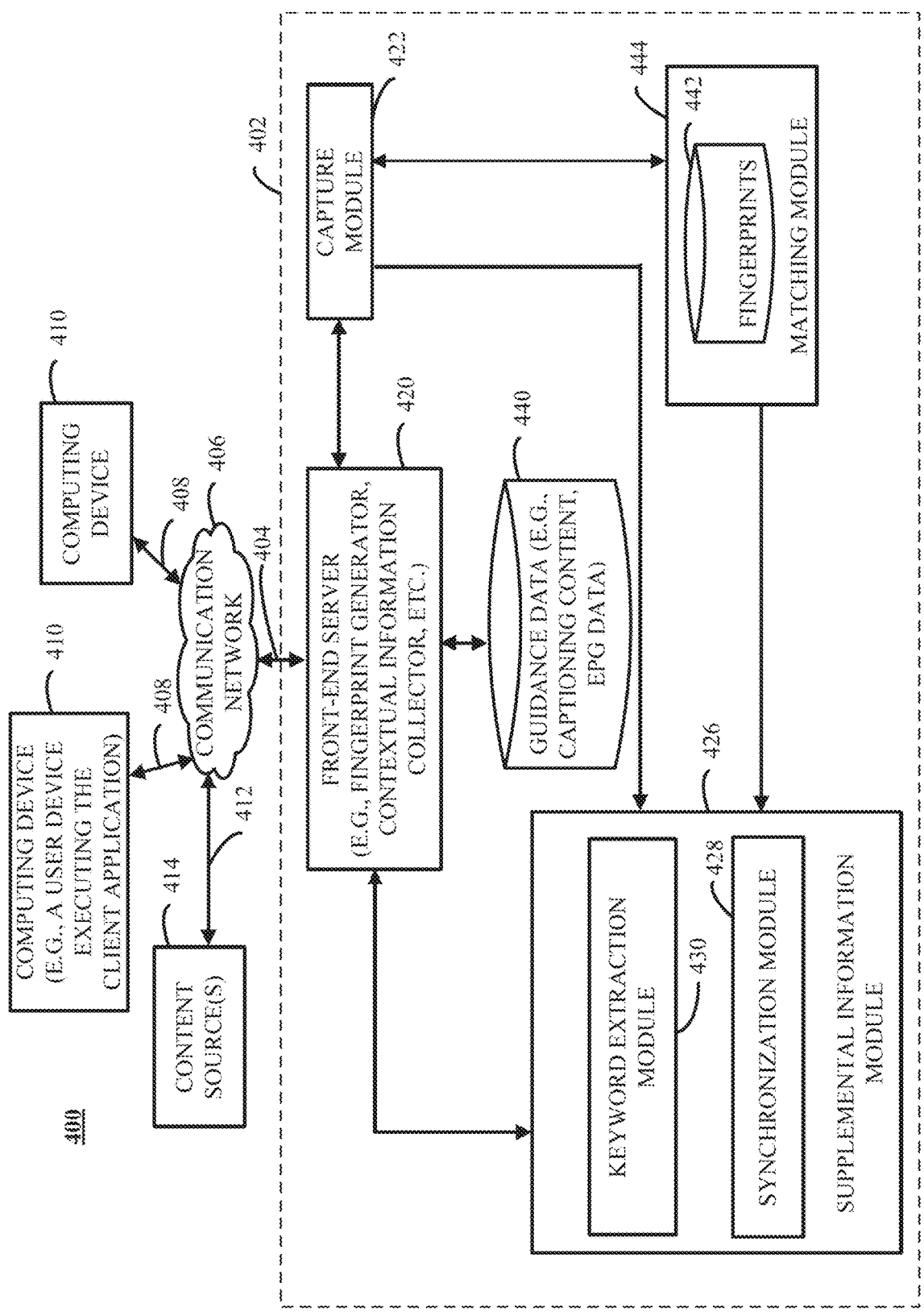
FIG. 4 shows a schematic diagram of an illustrative system suitable for implementation of the mechanisms described herein for providing supplemental content, such as text snippets and URLs to content related to the context of the media content, in accordance with some implementations of the disclosed subject matter.

Turning to FIG. 4, an illustrative example 400 of a generalized schematic diagram of a system on which the mechanisms for presenting contextual information corresponding to on-demand media content is shown in accordance with some implementations of the disclosed subject matter. As illustrated, system 400 can include one or more computing devices 410. Computing devices 410 can be connected by one or more communication links 408 to a communications network 406 that can be linked via a communications link 404 to a server 402. In some implementations, computing devices 410 and server 402 can be linked via a communications link 412 to one or more content sources 414.

System 400 can include one or more servers 402. Server 402 can be any suitable server for providing access to the application, such as a processor, a computer, a data processing device, or any suitable combination of such devices. For example, the application can be distributed into multiple backend components and multiple frontend components and/or interfaces. In a more particular example, backend components, such as data collection and data distribution can be performed on one or more servers 402.

In some implementations, front-end components of the application (or a portion of the application), such as a user interface and/or channel identification features can be performed on one or more computing devices 410.

In some implementations, each of the computing devices 410 and server 402 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 410 can be implemented as a smartphone, a tablet computer, a wearable computer, a smart television, a set-top box, a digital media receiver, a game console, a personal computer, a laptop computer, a personal data assistant (PDA), a home entertainment system, any other suitable computing device, or any suitable combination thereof. In this example, computing device 410 can present a program, such as an on-demand program, and supplemental content that may be contextually relevant to the program (e.g., via a web browser extension executing on a web browsing application installed on computing device 410).

For example, in some implementations, a program can be presented using a first computing device 410, such as a smart television, a set-top box, a digital media receiver, a desktop computer, etc., and supplemental content can be presented using a second computing device 410, such as a tablet computer, a smartphone, a wearable computer, a PDA, etc.

In some implementations, content source(s) 414 can be any suitable content sources, such as a cable (or telephone) television content source, a satellite television content source, an on-demand program content source, an over-the-top program content source, an Internet content source, a streaming program content source, any other suitable content source, or any suitable combination thereof.

In some implementations, communications network 406 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 404, 408, and 412 can be any communications links suitable for communicating data among computing devices 410, server 402, and/or content source(s) 414, such as network links, dial-up links, wireless links, hard-wired links, any other suitable communications links, or any suitable combination of such links. Computing devices 410 can enable use of the techniques described herein that can allow the features of the mechanisms to be used. Computing devices 410, server 402 and content source(s) 414 can be located at any suitable location.

In some implementations, server 402 can include one or more modules 420-430 and/or databases 440-442 that can be interconnected, for performing various functions of the application and/or facilitating the mechanisms for presenting supplemental information corresponding to on-demand media content.

In some implementations, a front-end server module 420 can perform processes for presenting supplemental information as described above in connection with, for example, FIGS. 1-3. For example, the front-end server can act as a proxy between the web browsing application and/or the web browser extension executing on computing device 410 and other server modules, such as capture module 422, matching module 424, and supplemental information module 426.

In some implementations, a capture module 422 can receive media data related to a program or a channel, such as video data, audio data, electronic program guide data, metadata, subtitles or captioning content, etc., as described above in connection with, for example, FIGS. 1-3. Additionally or alternatively, capture module 422 can extract various media data from content provided from content sources as described in connection with, for example, FIGS. 1-3. Such extracted media data can include, for example, audio fingerprints, subtitles, etc. This information can be stored, for example, in a database (not shown) for use by the search application executing on front-end server 420 in identifying media content items, obtaining supplemental content items, and/or various other operations.

In some implementations, guidance data 440, such as an electronic program guide (EPG) database and a closed caption database, can be accessed. For example, front-end server module 420 can access guidance data 440 to obtain program information related to an identified program and use the program information to search for matching supplemental content items. It should be noted that, in some implementations, guidance data 440 can be provided from, for example, content source(s) 414.

In some implementations, a matching module 424 can receive audio fingerprint data and/or video fingerprint data for a program from capture module 422 and compare the received fingerprint data against stored fingerprint data in a fingerprint database 442. This fingerprint database can be used, for example, to determine a program that is being presented to a user, to determine a particular playback position in the program, etc.

In some implementations, a supplemental content module 426 can find matching supplemental content items associated with a program using keyword extraction module 430 and synchronization module 428. For example, keyword extraction module 430 can extract keywords from captured audio data, video data, and/or subtitle information and obtain supplemental content items from multiple content sources (e.g., content sources 414). In some implementations, keyword extraction module 430 can then rank each of the supplemental content items by recency, popularity (e.g., popularity based on click-through-rate), etc. In response to ranking the supplemental content items, keyword extraction module 430 can select at least one of the supplemental content items for presenting to the user at a particular position in the program.

In some implementations, a timeline can be associated with each program, where a supplemental content item can be associated with a timestamp or time period indication that identifies the time that the corresponding media content occurred (e.g., portion of the television program that provides the text snippet).

In response to identifying the on-demand content item and determining an associated program that has been broadcasted by a television provider, front-end server 420 can access the timeline associated with the associated program and return supplemental content (if any) that can be presented to the user. In some implementations, a representation of the one or more supplemental content items can then be provided. For example, the representation can include a snippet of web content, a thumbnail image, a URL to a document, etc.

It should be noted that, although modules 420-430 and databases 440-442 are shown as being included in server 402, these modules and/or databases can be provided in different servers in various combinations. For example, supplemental information module 426 can be provided on a first server and modules 420-424 can be provided on a second server. As another example, each module can be provided on a different server. It should be noted that these are merely examples, and the modules described can be organized in any suitable manner.

It should also be noted that modules 420-430 can be included as part of the application, can each be a separate application, or can be part of any other suitable application.

Figure 5:
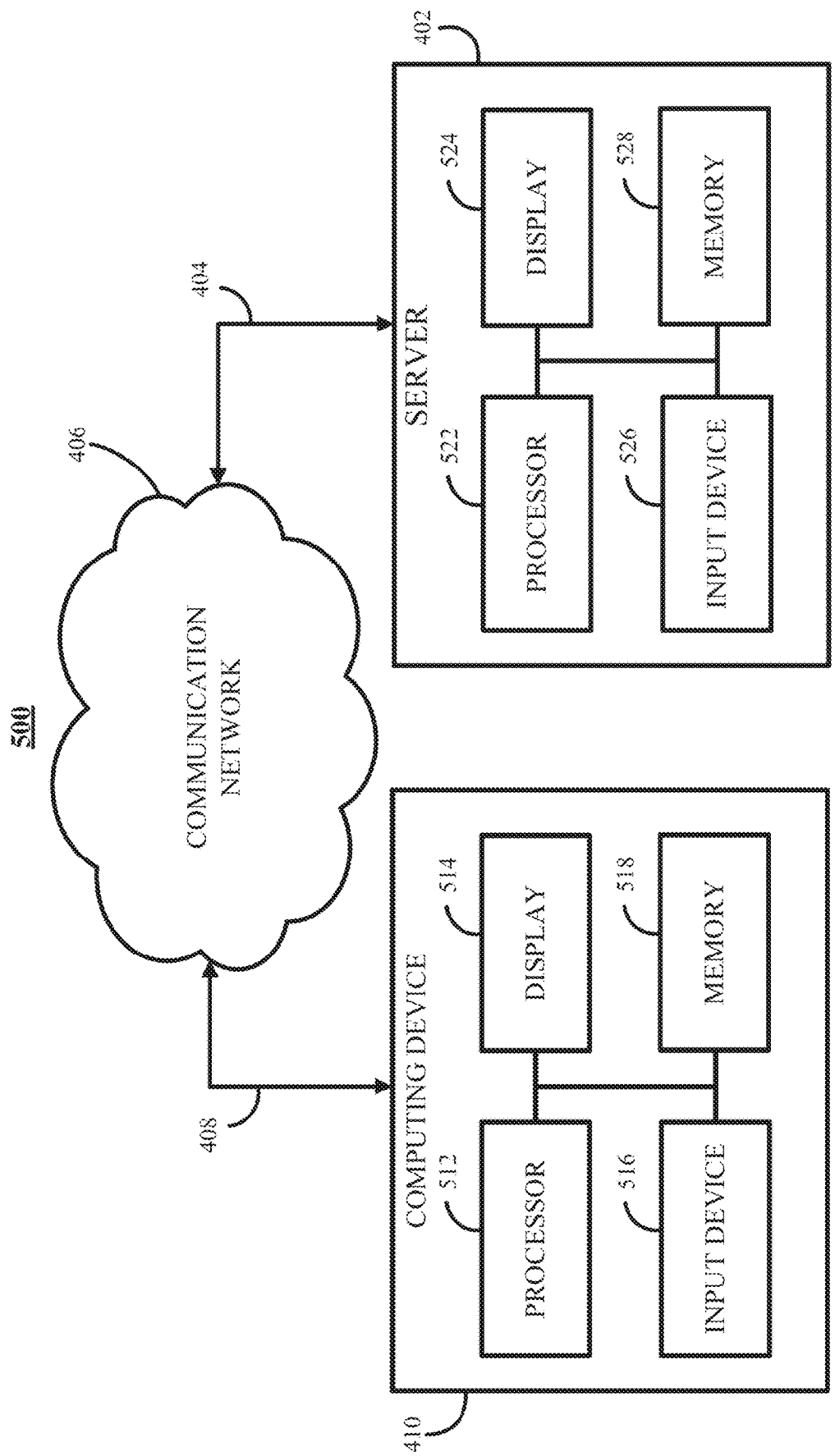
FIG. 5 shows a detailed example of a server and one of the computing devices of FIG. 4 that can be used in accordance with some implementations of the disclosed subject matter.

FIG. 5 illustrates an example 500 of hardware that can be used to implement server 402 and one of computing devices 410 depicted in FIG. 4 in accordance with some implementations of the disclosed subject matter. Referring to FIG. 5, computing device 410 can include a hardware processor 512, a display 514, an input device 516, and memory 518, which can be interconnected. In some implementations, memory 518 can include a storage device (such as a non-transitive computer-readable medium) for storing a computer program for controlling hardware processor 512.

Hardware processor 512 can use the computer program to present on display 514 content and/or an interface that allows a user to interact with the web browsing application and to send and receive data through communications link 408. It should also be noted that data received through communications link 408 or any other communications links can be received from any suitable source. In some implementations, hardware processor 512 can send and receive data through communications link 408 or any other communication links using, for example, a transmitter, receiver, transmitter/receiver, transceiver, or any other suitable communication device. Input device 516 can be a computer keyboard, a mouse, a trackball, a keypad, a remote control, any other suitable input device, or any suitable combination thereof. Additionally or alternatively, input device 516 can include a touch screen display 514 that can receive input (e.g. using a finger, a stylus, or the like).

Server 402 can include a hardware processor 522, a display 524, an input device 526, and memory 528, which can be interconnected. In some implementations, memory 528 can include a storage device for storing data received through communications link 404 or through other links, and processor 522 can receive commands and values transmitted by one or more users of, for example, computing device 410. The storage device can further include a server program for controlling hardware processor 522.

The mechanisms described herein for providing news items and other news-related content based on media content can be implemented in computing devices 410 and/or server 502 as software, firmware, hardware, or any suitable combination thereof.

In some implementations, server 402 can be implemented as one server or can be distributed as any suitable number of servers. For example, multiple servers 402 can be implemented in various locations to increase reliability, function of the application, and/or the speed at which the server can communicate with computing devices 410.

In some implementations, the client application can include an application program interface (not shown), and/or can be resident in memory 518 of computing device 410 and/or memory 528 of server 402. Additionally or alternatively, a graphical user interface ("GUI") can be distributed to computing device 510, which can allow a user to interact with the client application resident at, for example, server 402.

In some implementations, the application can include client-side software, server-side software, hardware, firmware, or any suitable combination thereof. For example, the application can encompass a computer program that causes one or more processors to execute the content generation application. As another example, the application(s) can encompass a computer program written in a programming language recognizable by computing device 510 and/or server 502 that is executing the application(s) (e.g., a program written in a programming language, such as, Java, C, Objective-C, C++, C #, Javascript, Visual Basic, HTML, XML, ColdFusion, any other suitable approaches, or any suitable combination thereof).

In some implementations, the application can encompass one or more Web-pages or Web-page portions (e.g., via any suitable encoding, such as HyperText Markup Language ("HTML"), Dynamic HyperText Markup Language ("DHTML"), Extensible Markup Language ("XML"), Java-Server Pages ("JSP"), Active Server Pages ("ASP"), Cold Fusion, or any other suitable approaches).

Accordingly, methods, systems, and media for presenting supplemental content corresponding to media content are provided.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 2 and 3 can be executed or performed in any order or sequence not limited to the order and sequence shown and described in the figures. Also, some of the above steps of the processes of FIGS. 2 and 3 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for providing information relating to presented media content, the method comprising:
   determining, using a hardware processor, whether a media content item being presented in a video window corresponds with one or more media content items stored in a media database, wherein portions of image data corresponding to media content items are each associated with a time;
   determining, using the hardware processor, that supplemental content has been generated for the media content item being presented in the video window, wherein the supplemental content is available for one or more of the portions of image data;
   selecting, using the hardware processor, a portion of the supplemental content based on at least one keyword that was extracted from a portion of the image data that includes the video window playing back the media content item;
   causing, using the hardware processor, an overlay interface that includes the portion of supplemental content to be presented concurrently with the media content item being presented in the video window.

2. The method of claim 1, wherein the media content item is being presented in the video window of a web browsing application.

3. The method of claim 2, further comprising receiving an indication from the web browsing application that the media content item is being presented in the video window.

4. The method of claim 3, wherein the indication includes at least one keyword that has been extracted from the media content item being presented in the video window.

5. The method of claim 2, wherein the web browser application includes a web browser extension that presents an indicator within an address bar of the web browsing application that the supplemental content which is synchronized with the presentation of the media content being presented in the video window is available.

6. The method of claim 5, wherein the web browsing application presents the overlay interface that includes the portion of supplemental content concurrently with the media content item being presented in the video window in response to detecting that the indicator has been selected.

7. The method of claim 1, wherein the media content item being presented in the video window is determined to correspond with the one or more media content items stored in the media database further comprises:
generating a fingerprint from at least a portion of media information associated with the media content item being presented in the video window; and
determining whether the fingerprint matches one of a plurality of fingerprints associated with the one or more media content items from a fingerprint database.

8. The method of claim 1, further comprising determining that the media content item is an on-demand video that has been selected for presentation in the video window by comparing the image data corresponding to the media content item with an on-demand video database.

9. The method of claim 1, wherein determining whether the media content item being presented in the video window corresponds with the one or more media content items stored in the media database further comprises:
extracting the media information from the media content item being presented in the video window.

10. A system for providing information relating to media content, the system comprising:
a hardware processor that is configured to:
determine whether a media content item being presented in a video window corresponds with one or more media content items stored in a media database, wherein portions of image data corresponding to media content items are each associated with a time;
determine that supplemental content has been generated for the media content item being presented in the video window, wherein the supplemental content is available for one or more of the portions of image data;
select a portion of the supplemental content based on at least one keyword that was extracted from a portion of the image data that includes the video window playing back the media content item;
cause an overlay interface that includes the portion of supplemental content to be presented concurrently with the media content item being presented in the video window.

11. The system of claim 10, wherein the media content item is being presented in the video window of a web browsing application.

12. The system of claim 11, wherein the hardware processor is further configured to receive an indication from the web browsing application that the media content item is being presented in the video window.

13. The system of claim 12, wherein the indication includes at least one keyword that has been extracted from the media content item being presented in the video window.

14. The system of claim 11, wherein the web browser application includes a web browser extension that presents an indicator within an address bar of the web browsing application that the supplemental content which is synchronized with the presentation of the media content being presented in the video window is available.

15. The system of claim 14, wherein the web browsing application presents the overlay interface that includes the portion of supplemental content concurrently with the media content item being presented in the video window in response to detecting that the indicator has been selected.

16. The system of claim 10, wherein the media content item being presented in the video window is determined to correspond with the one or more media content items stored in the media database further comprises:
generating a fingerprint from at least a portion of media information associated with the media content item being presented in the video window; and
determining whether the fingerprint matches one of a plurality of fingerprints associated with the one or more media content items from a fingerprint database.

17. The system of claim 10, wherein the hardware processor is further configured to determine that the media content item is an on-demand video that has been selected for presentation in the video window by comparing the image data corresponding to the media content item with an on-demand video database.

18. The system of claim 10, wherein determining whether the media content item being presented in the video window corresponds with the one or more media content items stored in the media database further comprises:
extracting the media information from the media content item being presented in the video window.

19. A non-transitory computer-readable medium containing computer executable instructions that, when executed by a processor, cause the processor to perform a method for providing information relating to media content, the method comprising:
determining whether a media content item being presented in a video window corresponds with one or more media content items stored in a media database, wherein portions of image data corresponding to media content items are each associated with a time;
determining that supplemental content has been generated for the media content item being presented in the video window, wherein the supplemental content is available for one or more of the portions of image data;
selecting a portion of the supplemental content based on at least one keyword that was extracted from a portion of the image data that includes the video window playing back the media content item;
causing an overlay interface that includes the portion of supplemental content to be presented concurrently with the media content item being presented in the video window.

* * * * *